(12) United States Patent
Lepczyk et al.

(10) Patent No.: US 10,953,894 B2
(45) Date of Patent: Mar. 23, 2021

(54) METHOD FOR ASSISTING A DRIVER

(71) Applicant: Audi AG, Ingolstadt (DE)

(72) Inventors: Daniel Lepczyk, Schrobenhausen (DE); Reimund Limbacher, Ingolstadt (DE); Gerhard Mauter, Kösching (DE); Ronny Heinzelmann, Ingolstadt (DE)

(73) Assignee: Audi AG, Ingolstadt (DE)

( * ) Notice: Subject to any disclaimer, the term of this patent is extended or adjusted under 35 U.S.C. 154(b) by 65 days.

(21) Appl. No.: 16/308,280

(22) PCT Filed: May 9, 2017

(86) PCT No.: PCT/EP2017/061039
§ 371 (c)(1),
(2) Date: Dec. 7, 2018

(87) PCT Pub. No.: WO2017/211526
PCT Pub. Date: Dec. 14, 2017

(65) Prior Publication Data
US 2019/0144005 A1    May 16, 2019

(30) Foreign Application Priority Data
Jun. 9, 2016   (DE) ..................... 10 2016 007 012.9

(51) Int. Cl.
*B60W 50/14*  (2020.01)
*B60W 50/00*  (2006.01)
(Continued)

(52) U.S. Cl.
CPC ............. *B60W 50/14* (2013.01); *B60K 35/00* (2013.01); *B60W 50/0097* (2013.01);
(Continued)

(58) Field of Classification Search
None
See application file for complete search history.

(56) References Cited

U.S. PATENT DOCUMENTS

| 8,063,755 B2 | 11/2011 | Eikelenberg et al. |
| 8,401,758 B2 | 3/2013 | Stählin et al. |

(Continued)

FOREIGN PATENT DOCUMENTS

| CN | 101542093 A | 9/2009 |
| CN | 102729997 A | 10/2012 |

(Continued)

OTHER PUBLICATIONS

International Preliminary Report on Patentability directed to related International Patent Application No. PCT/EP2017/061039, dated Dec. 11, 2018, with attached English-language translation; 16 pages.

(Continued)

*Primary Examiner* — Peter D Nolan
*Assistant Examiner* — Demetra R Smith-Stewart
(74) *Attorney, Agent, or Firm* — Sterne, Kessler, Goldstein & Fox P.L.L.C.

(57) ABSTRACT

The disclosure relates to a method for assisting a driver of a motor vehicle in which a target value for a future acceleration of the motor vehicle and an actual value for an instantaneous acceleration of the motor vehicle are determined, wherein the target value and the actual value are compared and displayed for the driver on a display panel, wherein the driver is informed whether he should increase or decrease acceleration by actuating a gas pedal of the motor vehicle.

12 Claims, 2 Drawing Sheets

Figure 1:
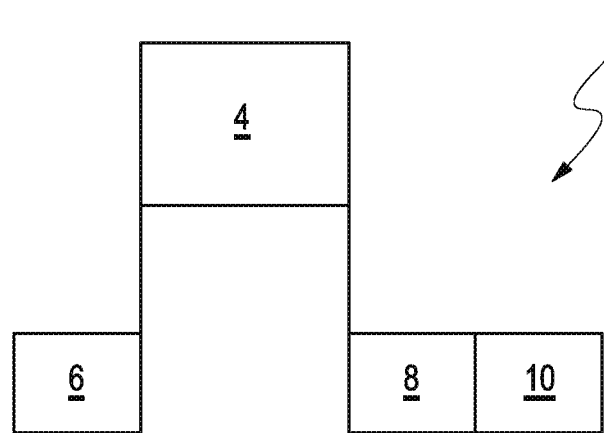

(51) Int. Cl.
*B60K 35/00* (2006.01)
*B60W 50/16* (2020.01)

(52) U.S. Cl.
CPC ....... *B60W 50/16* (2013.01); *B60K 2370/155* (2019.05); *B60K 2370/334* (2019.05); *B60K 2370/52* (2019.05); *B60W 2050/146* (2013.01); *B60W 2520/10* (2013.01); *B60W 2520/105* (2013.01); *B60W 2554/80* (2020.02); *B60W 2555/60* (2020.02); *B60W 2556/50* (2020.02); *B60W 2720/106* (2013.01)

(56) References Cited

U.S. PATENT DOCUMENTS

| | | | |
|---|---|---|---|
| 8,543,308 B2 | 9/2013 | Levy et al. | |
| 8,560,200 B2 | 10/2013 | Maruyama | |
| 10,328,936 B2* | 6/2019 | Kelly | B60W 50/10 |
| 2009/0157267 A1 | 6/2009 | Shin et al. | |
| 2009/0288636 A1 | 11/2009 | Saito et al. | |
| 2013/0173111 A1* | 7/2013 | Syed | B60K 35/00 |
| | | | 701/36 |
| 2014/0129099 A1 | 5/2014 | Fuke | |
| 2016/0185216 A1* | 6/2016 | Clarke | B60K 17/35 |
| | | | 74/665 F |
| 2016/0251057 A1* | 9/2016 | Stegmaier | B62M 6/45 |
| | | | 701/22 |
| 2016/0355167 A1* | 12/2016 | Erban | B60T 8/17616 |
| 2017/0088135 A1* | 3/2017 | Kelly | B60W 50/10 |

FOREIGN PATENT DOCUMENTS

| | | |
|---|---|---|
| CN | 103717861 A | 4/2014 |
| DE | 10341846 A1 | 3/2005 |
| DE | 102007032722 A1 | 2/2008 |
| DE | 102008060869 A1 | 6/2009 |
| DE | 102010029467 A1 | 12/2011 |
| DE | 102011017039 A1 | 5/2012 |
| DE | 102011055855 A1 | 6/2012 |
| DE | 102012214873 A1 | 3/2014 |
| DE | 102013003147 A1 | 8/2014 |
| DE | 102013013853 A1 | 2/2015 |
| DE | 102013016427 B3 | 3/2015 |
| EP | 2944532 A2 | 11/2015 |
| WO | WO 2010/112872 A1 | 10/2010 |
| WO | WO 2015/079301 A1 | 6/2015 |

OTHER PUBLICATIONS

International Search Report and Written Opinion of the International Search Authority directed to related International Patent Application No. PCT/EP2017/061039, dated Jul. 24, 2017, with attached English-language translation; 22 pages.

Chinese Application No. 201780035214.4, Office Action dated Jan. 6, 2021; 8 pages.

* cited by examiner ns of 10,953,894 B2

METHOD FOR ASSISTING A DRIVER

TECHNICAL FIELD

The present application refers to a system and a method for assisting a driver of a motor vehicle.

BACKGROUND

For assisting a driver of a motor vehicle, evaluating indications are provided that downstream evaluate how uniformly moderate acceleration has been, or that just give a warning to accelerate moderately. However, such indications or other assisting measures do not provide the driver any information about how sharply he should accelerate or depress the accelerator during an acceleration process. Consequently, the accelerator is to be actuated by the driver during an acceleration process, unless he uses an assistance system to cause the vehicle to move. However, as a rule, this does not lead to the most efficient acceleration process if the motor vehicle is moved more inefficiently than possible, because an acceleration is performed too weakly or even too sharply.

DE 10 2007 032 722 A1 describes a method for optimizing motor vehicle operation using haptic interaction with a driver. In this case, a haptic drive instruction for optimizing at least one preset operating variable of the motor vehicle is transmitted via a pedal system to the driver as a function of instantaneous operating parameters, wherein at least an acceleration desire of the driver is considered as an operating parameter.

A method for assisting a driver of a motor vehicle is known from DE 10 2010 029 467 A1. An anticipated partial driving route is determined that permits driving at a constant target speed. In addition, a constant target speed and a target acceleration for approaching the target speed are determined, wherein the target acceleration is displayed for the driver.

A vehicle monitoring device having a microprocessor is known from WO 2010/112872 A1. The microprocessor is programmed to simulate a power train of a motor vehicle and to receive signals from a vehicle management system in order to produce a real-time simulated model of the vehicle's powertrain operation, from which the vehicle's actual instantaneous fuel consumption and/or emissions can be predicted during operation of the vehicle. Predetermined optimum performance characteristics for the powertrain may be compared to the prevailing conditions in order to display the instantaneous operating conditions in relation to an optimum under any driving conditions.

BRIEF DESCRIPTION OF DRAWINGS/FIGURES

FIG. 1 illustrates a system, in accordance with some embodiments.

Figure 2:
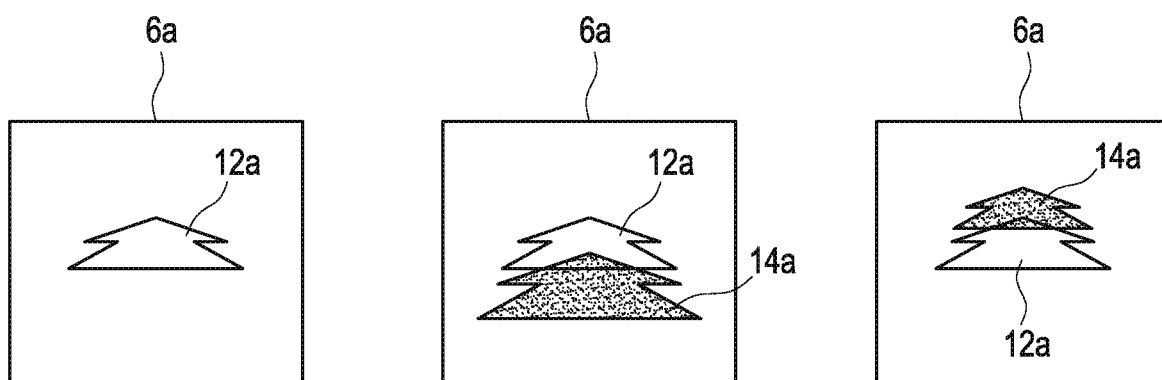

FIGS. 2a, 2b, and 2c are schematic depiction of a display panel in different operating situations, in accordance with some embodiments.

FIGS. 3a, 3b, 3c, and 3d are schematic depiction of a display panel in different operating situations, in accordance with some embodiments.

Figure 4:
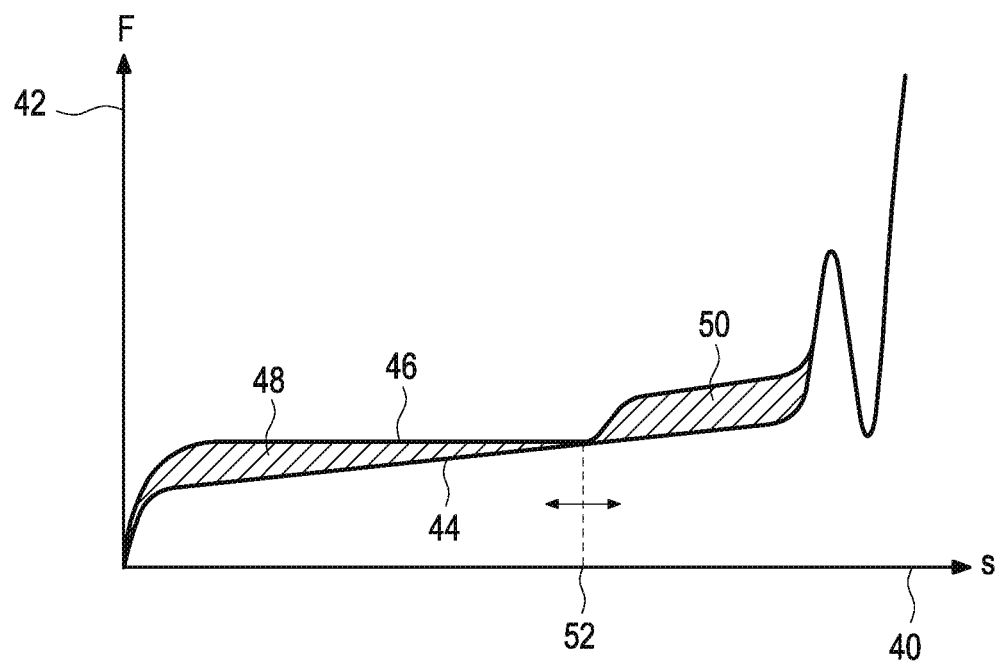

FIG. 4 is a diagram describing a relationship between an additional force and an operating displacement of the gas pedal of a motor vehicle, in accordance with some embodiments.

DETAILED DESCRIPTION

A method and a system having the features of the independent patent claims are presented. Embodiments of the method and system proceed from the dependent patent claims and the description.

In accordance with some embodiments, a method is provided for assisting a driver of a motor vehicle, wherein a target value for a future acceleration of the motor vehicle and an actual value of an instantaneous acceleration of the motor vehicle are determined. The target value and the actual value are compared for the driver in a representation or using symbols on a display panel, wherein based on a representation comparing the actual value and the target value for the acceleration, the driver is informed whether he should increase or decrease acceleration by actuating a gas pedal of the motor vehicle, wherein a speed of the motor vehicle is to be increased or at least kept constant using an acceleration that is greater than 0 m/s$^2$.

Normally the target value is determined when the speed of a vehicle, e.g., based on a specification of the motor vehicle and/or based on a speed of a vehicle traveling immediately ahead of the motor vehicle, is to be changed.

The display panel is not activated unless the actual value of the acceleration differs from the target value for the acceleration by at least a tolerance value. In this case the display panel is only activated and/or is predictively activated if the speed is to be changed on a segment to be traveled in the future.

In accordance with some embodiments, information about topology of the segment to be traveled in the future, information about a maximum permitted speed or about a speed limit on the segment to be traveled in the future, and information about an environment of the segment to be traveled in the future, e.g., a storm that is currently affecting the segment, is determined, a future target value for the speed on the segment being determined from this information. Such information is to be determined with at least one sensor of the motor vehicle and/or with a navigation device.

In accordance with some embodiments, a motor vehicle traveling ahead of the motor vehicle is detected by a sensor and the target value for the acceleration as a function of a speed of this motor vehicle is adjusted. If the vehicle traveling ahead first travels slowly and then turns, it is possible to increase the target value for the acceleration.

In some embodiments, with a gas pedal of the motor vehicle that is to be actuated for accelerating the motor vehicle, using an actuator that cooperates with the gas pedal, an additional force for the gas pedal is generated that represents a difference between the actual value of the acceleration and the target value. This additional force is to be determined, e.g., by comparing the actual value of the acceleration to the target value. Thus it is possible to assist the driver haptically and/or mechanically during acceleration visually using the display panel and using the gas pedal that is actuated by the actuator with the additional force.

The additional force is adjusted taking into account a characteristic of curve that describes a relationship between the additional force and an operating displacement of the gas pedal.

The target value for the acceleration or for a positive change in the speed of the motor vehicle is determined taking into account at least one instantaneous value of a kinematic variable, i.e. a location, the speed and/or the acceleration of the motor vehicle, as well as taking into account at least one specification for the at least one kinematic variable using an algorithm for determining a speed of the motor vehicle. With the location of the motor vehicle, it is taken into account what maximum speed of the motor vehicle is to be adjusted and/or is permitted.

In accordance with some embodiments, an instantaneous value of the at least one kinematic variable of the motor vehicle is determined by a control device of the motor vehicle and, based thereon, an actual value is determined for a speed of the motor vehicle, from which the actual value of the acceleration is derived. In addition, at least one specified value of the at least one kinematic variable is determined and, based thereon, a target value for the speed of the motor vehicle is determined, from which the target value for the acceleration is derived.

In some embodiments, the actual value and the target value for the speed are compared to one another.

In accordance with some embodiments, a first symbol is used for the target value for the acceleration and a second symbol is used for the actual value of the acceleration, wherein these two symbols are depicted relative to one another on the display panel. To this end, the two symbols may have positions on the display panel that are different relative to one another, wherein their positions change dynamically as the target value and/or actual value change, possibly dynamically. Such symbols are embodied, e.g., as arrows or schematic representations of a motor vehicle.

In accordance with some embodiments, the symbols are different in color, wherein, e.g., a color of the second symbol for the actual value of the acceleration may change. A particular color is to be adjusted, e.g., depending on whether the actual value of the acceleration is greater than or less than the target value. Such a change in color should be made, e.g., when the actual value of the acceleration changes compared to the target value.

In accordance with some embodiments, a system is disclosed for assisting a driver of a motor vehicle. The system comprises a control device and a display panel. The control device is configured to determine a target value for a future acceleration of the motor vehicle and an actual value of an instantaneous acceleration of the motor vehicle. The display panel is adapted to compare for the driver, in a representation or using symbols, the target value and the actual value, the driver being informed whether he should increase or decrease acceleration by actuating a gas pedal of the motor vehicle.

In accordance with some embodiments, the system comprises the gas pedal and an actuator that cooperates with the gas pedal, the actuator being configured to generate an additional force for the gas pedal, which force represents a difference between the actual value of the acceleration and the target value.

In accordance with some embodiments, a method for providing situational acceleration recommendation to the driver is disclosed.

The driver is to be assisted during the phases of acceleration and deceleration as negative acceleration and is to be encouraged to actuate the gas pedal or accelerator in that an actual value and a target value or an actual range and a target range are displayed on the display panel with the symbols. Here, using the symbols as a function of the position of the symbols relative to one another and their colors, the driver obtains instructions about how he should ideally depress, and thus actuate, the gas pedal in the coming driving situation in order to drive most efficiently. The instructions are provided, e.g., predictively in such situations in that, in brief, the speed of the motor vehicle is or is to be increased or decreased based on an external specification, e.g., an exit or entrance for a locality or if a motor vehicle ahead of the vehicle is traveling faster or slower.

In accordance with some embodiments, for determining an efficient acceleration for a coming drive with the motor vehicle, an efficiency value for an acceleration and/or a speed is specified, which efficiency value indicates a ratio between a change in consumption and a change in drive time associated with the change in consumption determined for a specific travel speed, it being determined from the efficiency value what consumption savings with a specific increase travel time are acceptable for the driver. Then a target function is set up that indicates the target value for an efficient acceleration for the travel, wherein the target function includes a change in travel time and a change in consumption for a specific target value for the acceleration of the motor vehicle proceeding from at least one initial speed to at least one interim speed, always in relation to at least one reference acceleration. Then the change in travel time and the change in consumption are determined. The target value for the efficient acceleration is determined using the set-up target function with the use of the determined change in travel time and change in consumption. A display of the target value or target range for acceleration, generally in comparison to the actual value of acceleration, is generated from the target value for efficient acceleration and is represented on the display panel as part of a motor vehicle driver assistance system. This supplementary measure for executing the method is also known from Audi AG's DE 10 2013 016 427 A1, which is hereby incorporated by reference for all purposes.

Using a recommendation for the target value for the acceleration, the driver should learn how to drive a more efficient acceleration process in which the driver adjusts the instantaneous actual value to the instantaneous target value for the acceleration and ideally brings them into alignment. This recommendation is displayed to the driver visually with symbols using the display panel. Since the comparison representation of the actual value and the target value on the display panel in one possible embodiment is only activated situationally and is only visible in appropriate situations, based on predictive data for the segment to be traveled in the future, this takes on the character of a coach who only provides assistance when there is also potential. A heads-up display, for example, that is depicted on the windshield because this is where the risk of distraction is at its lowest for the driver, is used as the display panel for the system. As needed, an instrument cluster may be used as an alternative. Furthermore, it is possible for the display panel to be embodied as a component of a portable device for data processing that is independent of the motor vehicle, e.g. a mobile telephone, and that may be coupled to the control device via an interface. The visual display is further enhanced with haptic instruction. This haptic instruction assists the driver and is imparted, for example, using the active gas pedal or accelerator in that the gas pedal uses the additional force to indicate how far it may and/or should be depressed. In addition, it is possible to supplement the comparison representation of the actual value and the target value with acoustic signals.

In accordance with some embodiments, the gas pedal of the motor vehicle is also controlled. Here the gas pedal is coupled to an actuator embodied as an adjusting means that is set up for forming an adjusting force acting on the gas pedal. Here efficiency information is determined that describes an energy efficiency of the driving operation of the motor vehicle that depends on a driving situation. As a function of the efficiency information, a characteristic curve that runs between two limit pedal positions and that describes the additional force exerted by the adjusting means on the gas pedal is determined and the actuator is actuated based on the course of the additional force, as is described in Audi AG's DE 10 2013 013 853 A1, which is hereby incorporated by reference for all purposes.

In accordance with some embodiments, the system for assisting the driver, which may also be called a driver assistance system for accelerating the motor vehicle by means of the gas pedal or accelerator, an actual value of the speed is supplied to the control device and a target value for the speed is specified. The control device is configured to determine optimized, efficient acceleration and to specify the target value based on operating parameters for the travel and/or motor vehicle. Moreover, an operating displacement and or angle of the gas pedal that changes according to the specified efficient acceleration is determined as the target value for the operating displacement and/or angle of the accelerator. The actuator that may be controlled by the control device is mechanically linked to the active gas pedal, wherein, with the actuator, the driver, or his foot, by actuating the gas pedal, sets a selectable operating displacement and/or angle to a target value for the operating displacement as the target value threshold, wherein the target value threshold may also be exceeded using the driver's foot, which proceeds from Audi AG's DE 10 2013 003 147 A1, which is hereby incorporated by reference for all purposes.

In accordance with some embodiments, a method to provide a hint to the driver to move foot, e.g., using a pressure point or a changeable increase in force on the gas pedal, is described.

The driver is encouraged to give more gas if the driver in an instantaneous operating situation is giving too little gas and the motor vehicle therefore cannot be accelerated efficiently. To this end, normally a course for the additional force is set on the active gas pedal at which course a level of the force drops from depressing the gas pedal or a depressing force drops to an ideal point at which efficient acceleration occurs so that the driver's foot is guided to an efficient point without the driver immediately perceiving this.

The driver is coached to actuate the gas pedal in such a manner that the acceleration process is accomplished as efficiently as possible. Thus a consumption potential may be developed that the driver cannot develop independently because he cannot know how to set the target value for efficient acceleration in each specific operating situation and thus each travel situation normally taking into account instantaneous kinematic operating parameters, e.g., actual values of the instantaneous speed and acceleration.

Using, e.g., a function to be executed by a control device of the engine, for each specific driving situation, an efficient speed is calculated that would be most efficient for the imminent acceleration, e.g., at an exit from 50 km/h to 100 km/h, in order to execute the acceleration process, for example taking into consideration an instantaneous speed limit and an imminent speed limit on a traveled segment, a position, and an actual value of the speed of the motor vehicle, an engaged gear, and a selected driving program. This speed is then represented as a symbol for the target value for acceleration on the aforesaid display panel if this is situationally logical. The actual value of the speed that the driver is influencing using the gas pedal is to be adjusted by the driver to the target value for the speed. The actual value of the speed is to be taken from the control device, from which a representation for the symbol of the actual value of the acceleration is then derived. The target value for efficient speed may be the basis for haptic feedback that, through the gas pedal, acts on the foot of the driver. The target value for the speed is to be converted using supplied data for characteristic curves for the gas pedal in the operating displacement and/or angle provided for the gas pedal and by adjusting the gas pedal for the driver in a haptic or perceivable manner.

The method and the system disclosed in accordance with the embodiments above assist the driver visually using the display panel and haptically using the gas pedal to adjust the acceleration of the motor vehicle to the specific provided target value and thus to move the motor vehicle efficiently, so that the situation in which the driver causes the motor vehicle to accelerate too slowly or too quickly is avoided.

It is understood that the aforesaid features and the features yet to be explained in the following are not limited in use to the specific combinations given, but rather may also be used in other combinations or by themselves without leaving the scope of the protection disclosed hereby.

The figures are described in context with one another and comprehensively.

Identical reference numbers are provided to identical components.

FIG. 1 shows a system, in accordance with some embodiments. A system 2 for assisting a driver of a motor vehicle comprises as components a control device 4, a display panel 6, an accelerator of the motor vehicle embodied as a gas pedal 8, and a actuator 10 that cooperates with the gas pedal 8.

While the motor vehicle is traveling, sensors determine operating parameters and thus also kinematic variables for the motor vehicle, such as location, speed, and/or acceleration, as well as topological variables for a traveled area. In addition, such operating parameters and therefore also kinematic variables of others using the road, that is, other motor vehicles that are using the same roadways as the motor vehicle, are determined. Moreover, specifications for a speed that is to be taken into account in the area and thus on a segment to be traveled are also determined.

Based on the operating parameters and/or specifications, an actual value and a target value for speed of the motor vehicle are determined by the control device 4. Based thereon, an actual value and a target value for acceleration of the vehicle are determined. The target value and the actual value of the acceleration are depicted and/or represented in symbols for the driver on the display panel 6. In doing so, the driver is shown whether the driver should increase or decrease acceleration by actuating the gas pedal 8 of the motor vehicle.

In addition, the actuator 10 that cooperates with the gas pedal 8 generates an additional force for the gas pedal 8 that represents a difference between the actual value of the acceleration and the target value and is imparted haptically to the driver using the gas pedal 8.

FIGS. 2a, 2b, and 2c are schematic depiction of a display panel in different operating situations, in accordance with some embodiments. A display panel 6a of the system 2 is depicted in FIGS. 2a, 2b, and 2c in different operating situations. Here a target value for the acceleration is depicted using a first symbol 12a, shown here as an arrow, wherein it is provided here that this symbol 12a is to be used as a reference value for the target value for the acceleration in the context of one embodiment of the method. A second symbol 14a is used for representing the actual value of the acceleration and here is also embodied as an arrow, and its position relative to the first symbol is variable, the second symbol 14a also changing its color.

In a first operating situation, the actual value and the target value for the acceleration are identical. In this case only the first symbol 12a is depicted here, it being possible for the first symbol 12a to cover the second symbol 14a.

In a second operating situation depicted using FIG. 2b, it is provided that the actual value of the acceleration is lower than the target value for the acceleration. In this case, the second symbol 14a, for the actual value of the acceleration, is colored, e.g., green. In addition, the second symbol 14a here is arranged below the first symbol 12a, so that the driver is also provided a visual indication that he can give more gas and thus accelerate.

In the third operating situation depicted in FIG. 2c, the second symbol 14a for the actual value of the acceleration is arranged above the first symbol 12a for the target value for the acceleration and is colored yellow. This indicates to the driver that the actual value of the acceleration is greater than the target value for the acceleration and the driver should give less gas.

In the example given here, for the display panel 6a, a position of the first symbol 12a with the target value for the acceleration is also to be changed dynamically, and as a rule is to be adapted to specifications for a speed to be driven in a region.

FIGS. 3a, 3b, 3c, and 3d are schematic depiction of a display panel in different operating situations, in accordance with some embodiments. A display panel 6b of the system 2 is depicted in FIGS. 3a, 3b, 3c, and 3d in different operating situations. In this case, a target value for the acceleration is depicted schematically using a first symbol 12b, here embodied as a motor vehicle, wherein here it is provided that this symbol 12b is used as a reference value for the target value for the acceleration in the context of an embodiment of the method. For depicting the actual value of the acceleration, here a second symbol 14b is used that in this case is also embodied as a motor vehicle and the position of which may be changed relative to the first symbol, the second symbol 14b also changing its color.

In a first operating situation, the actual value and the target value for the acceleration are identical. In this case, only the first symbol 12b is depicted, it being possible for the first symbol 12b to cover the second symbol 14b.

Figure 3:
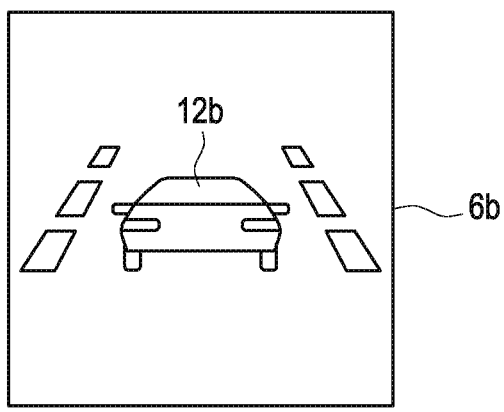
Figure 3:
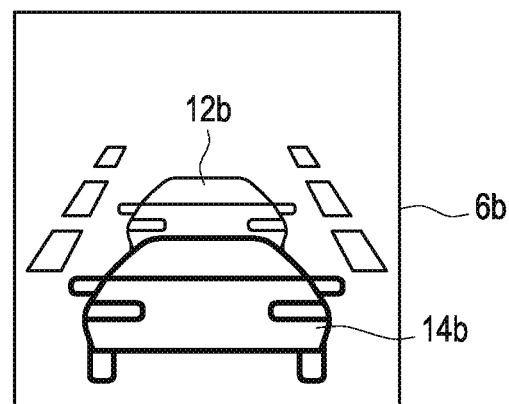
Figure 3:
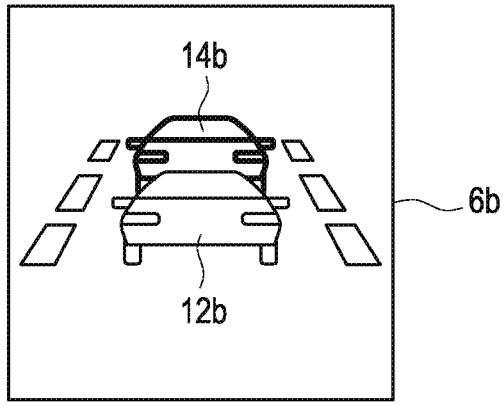
Figure 3:
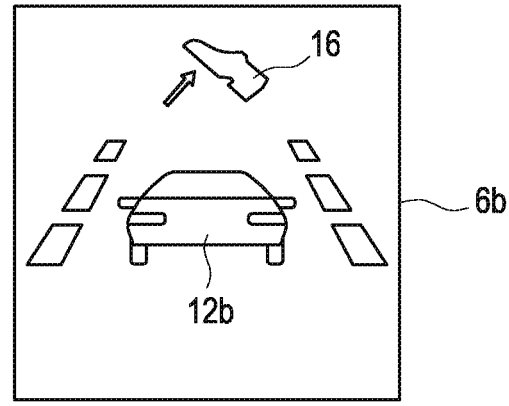

In one operating situation depicted in FIG. 3b, it is provided that the actual value of the acceleration is lower than the target value for the acceleration. In this case, the second symbol 14b is colored green for the actual value of the acceleration. In addition, the second symbol 14b is arranged below the first symbol 12b here, so that the driver is provided a visual indication that he can give more gas and thus accelerate.

In the operating situation depicted in FIG. 3c, the second symbol 14b for the actual value of the acceleration is arranged above the first symbol 12b for the target value for the acceleration and is colored yellow here. This indicates to the driver that the actual value of the acceleration is greater than the target value for the acceleration, and that the driver should give less gas.

FIG. 3d illustrates a variant of the depiction of the display panel 6b from 3a. In this case, in addition to the first symbol 12b, an additional symbol 16 is illustrated that comprises a shoe and an arrow pointing at it, which explains that the driver's foot should lift up from the gas pedal 8. If, alternatively to this, the arrow points away from the shoe and/or in the direction opposite to the arrow shown here, a corresponding additional symbol indicates that more gas should be given.

In the example for the display panel 6b presented here, a position of the first symbol 12b with the target value for the acceleration should also be changed dynamically and, as a rule, should be adapted to the specifications for a speed to be driven in the specific area.

FIG. 4 is a diagram describing a relationship between an additional force and an operating displacement of the gas pedal of a motor vehicle, in accordance with some embodiments. An abscissa 40 along which an operating displacement s of the gas pedal 8 is displayed. Displayed over this is an ordinate 42 for a force, here an additional force, that is generated by the gas pedal 8. The diagram comprises a first passive characteristic curve 44 and a second active characteristic curve 46. Between the two characteristic curves 44, 46 in the hash-marked regions 48, 50 are values, dependent on the operating displacement s, of the additional force that is generated by the actuator 10. A point 52 here illustrates a value for an optimum operating displacement of the gas pedal 8 in which the two characteristic curves 44, 46 are identical. If the second characteristic curve 46 after the operating displacement has a negative value, wherein values of the second characteristic curve 46 in this case are also greater than values of the first characteristic curve 44, the driver is encouraged to give more gas. In this case, the gas pedal 8 yields to being depressed. On the other hand, if the value is positive, the gas pedal 8 presses against the driver's foot. Normally the driver should not depress the gas pedal beyond the point 52 for the optimal operating displacement, which in this case is facilitated by the additional force acting as a counterforce. Moreover, as indicated in the diagram using a double arrow, it is possible to variably adjust the point 52 relative to values for the operating displacements.

The invention claimed is:

1. A method for assisting a driver of a motor vehicle, comprising:
   determining a target value for a future acceleration of the motor vehicle;
   determining an instantaneous value of at least one kinematic variable of the motor vehicle by a control device;
   in response to the determined instantaneous value, determining an actual value for a speed of the motor vehicle;
   based on the actual value for the speed, determining an actual value of an instantaneous acceleration of the motor vehicle;
   comparing the target value for the future acceleration with the actual value of the instantaneous acceleration to provide a comparison result;
   displaying the comparison result on a display panel; and
   recommending an acceleration change by actuating a gas pedal of the motor vehicle, wherein the gas pedal is actuated by an actuator.

2. The method of claim 1, further comprising determining the target value in response to a determination that a change in speed of the motor vehicle is needed.

3. The method of claim 1, further comprising activating the display panel in response to a difference between the actual value of the instantaneous acceleration and the target value for the future acceleration being outside of a tolerance value range.

4. The method of claim 1, further comprising activating the display panel in response to a determination that a change in speed is required on a segment to be traveled at a future time.

5. The method of claim 4, further comprising:
   determining a future target value for the speed based on determination of at least one of:

information about topology of the segment;
information about a maximum permitted speed on the segment; and
information about an environment of the segment.

6. The method of claim 1, further comprising generating an additional force for the gas pedal, wherein the additional force represents a difference between the actual value of the instantaneous acceleration and the target value for the future acceleration.

7. The method of claim 6, further comprising considering a characteristic curve to adjust the additional force, wherein the characteristic curve describes a relationship between the additional force and an operating displacement of the gas pedal.

8. The method of claim 1, further comprising displaying a first symbol and a second symbol on the display panel,
wherein the first symbol is used for the target value for the future acceleration and the second symbol is used for the actual value of the instantaneous acceleration, and
wherein the first symbol and the second symbol are displayed relative to one another.

9. A system for assisting a driver of a motor vehicle, comprising:
a display panel; and
a control device, the control device configured to:
determine a target value for a future acceleration of the motor vehicle;
determine an instantaneous value of at least one kinematic variable of the motor vehicle;
in response to the determined instantaneous value, determine an actual value for a speed of the motor vehicle;
based on the actual value for the speed, determine an actual value of an instantaneous acceleration of the motor vehicle;
compare the target value for the future acceleration with the actual value of the instantaneous acceleration to provide a comparison result;
display the comparison result on the display panel; and
recommend acceleration changes by actuating a gas pedal of the motor vehicle, wherein the gas pedal is actuated by an actuator, and
wherein the display panel is adapted to display:
the comparison of the target value and the actual value, and
a recommendation to adjust acceleration of the motor vehicle.

10. The system of claim 9, wherein the actuator is coupled with the gas pedal and is configured to generate an additional force for the gas pedal, the additional force representing a difference between the actual value of the instantaneous acceleration and the target value for the future acceleration.

11. The system of claim 9, wherein the display panel is a heads-up display on a windshield.

12. The system of claim 9, wherein the display panel is communicatively coupled with the control device via an interface, and wherein the display panel is on a portable device.

* * * * *